(12) United States Patent
Marlett et al.

(10) Patent No.: US 8,386,132 B2
(45) Date of Patent: Feb. 26, 2013

(54) MANUAL TRANSMISSION NEUTRAL SWITCH DIAGNOSTIC AND MOVEMENT PREVENTION METHOD AND SYSTEM

(75) Inventors: Chad E. Marlett, Plymouth, MI (US); Adam C. Chiappetta, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 609 days.

(21) Appl. No.: 12/685,165

(22) Filed: Jan. 11, 2010

(65) Prior Publication Data

US 2011/0172884 A1 Jul. 14, 2011

(51) Int. Cl.
*B60R 22/00* (2006.01)

(52) U.S. Cl. ............ 701/48; 701/79; 701/93; 303/147; 303/160

(58) Field of Classification Search ............ 701/48, 701/66, 69, 76, 78, 79, 93; 303/123, 147, 303/160, 164
See application file for complete search history.

(56) References Cited

U.S. PATENT DOCUMENTS

| 4,891,758 A | 1/1990 | Simonyi et al. |
| 2006/0214506 A1* | 9/2006 | Albright et al. ............ 303/123 |

FOREIGN PATENT DOCUMENTS

| DE | 10065023 | 7/2002 |
| DE | 102005015159 | 10/2006 |
| GB | 2466109 | 6/2010 |
| JP | 2009292219 | 12/2009 |
| WO | WO2008113554 | 9/2008 |
| WO | WO2010031618 | 3/2010 |

* cited by examiner

*Primary Examiner* — Gertrude Arthur Jeanglaude
(74) *Attorney, Agent, or Firm* — Ralph E. Smith

(57) ABSTRACT

A method and system for preventing vehicle movement during start-up arising from a false-neutral indication. Using signals from one or more wheel speed sensors of the vehicle, a vehicle processor determines if the vehicle is moving during start-up, and if so, outputs a termination signal to shut-down the vehicle before any additional movement occurs.

14 Claims, 3 Drawing Sheets

MANUAL TRANSMISSION NEUTRAL SWITCH DIAGNOSTIC AND MOVEMENT PREVENTION METHOD AND SYSTEM

FIELD OF THE INVENTION

The technology herein relates generally to using existing vehicular sensors to determine non-sensed vehicular characteristics. More particularly, the technology herein relates to using a vehicle's wheel speed sensor to determine whether the vehicle is in a false-neutral state and to prevent unintended vehicle movement.

BACKGROUND OF THE INVENTION

A manual transmission vehicle can generally be started by an operator by depressing the vehicle's clutch while using the vehicle's ignition system. Most manual transmission vehicles may also be started without depressing the clutch if the vehicle's transmission is in neutral. In neutral, the transmission's gears are already disengaged and no harm should result to the vehicle if the vehicle is started without depressing the vehicle's clutch.

However, a failure in one or more vehicle systems could cause the vehicle's electronic control unit (ECU) to falsely identify the vehicle as being in neutral. For example, a switch failure or an electrical short could result in the vehicle's ECU to report that the vehicle is in neutral when indeed the vehicle is actually in gear. In such a situation, the vehicle's ECU would allow an operator to attempt to start the vehicle without depressing the clutch. As a result, damage could occur to the car or the car could uncontrollably attempt to move since the vehicle is already in gear.

In order to avoid this potential problem, vehicle manufacturers have either disabled the ability to start the vehicle without depressing the clutch or have added an additional switch to provided redundancy in the event of a switch failure. However, these solutions are not optimal as, on the one hand, the solution requires removal of a convenient operator feature of the vehicle, and on the other hand, the solution requires additional cost and complexity resulting from the need for additional components and control of those components.

Therefore, an improved solution to the problem of ensuring that a vehicle is not started out of neutral when the vehicle's clutch is not depressed is desired.

BRIEF SUMMARY OF THE INVENTION

In various example embodiments, the technology described herein provides methods and systems for diagnosing whether a vehicle is in a false-neutral state and for preventing vehicle movement during start-up arising from a false-neutral indication. During a start-up process, a vehicle processor monitors signals output from one or more wheel speed sensors to determine whether the vehicle is moving. If vehicle movement is sensed, the start-up process is terminated in order to avoid unintended vehicle movement.

In one example embodiment, the technology provides a method and system for preventing unintended vehicle movement arising from a false-neutral indication even when the vehicle's clutch is not depressed during a start-up process.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

In various example embodiments, the technology described herein provides a method and system for diagnosing if a manual transmission vehicle is actually in a neutral state during the vehicle start-up process. Through the disclosed diagnosis system, unintended vehicle movement during the startup process is avoided. Other benefits and applications of the disclosed method and system are also contemplated herein, as will be obvious to those of ordinary skill in the art.

In order to avoid unintentional or accidental starting of a manual transmission vehicle without depressing the vehicle's clutch, the vehicle's electronic control unit (ECU) may be modified to include instructions further limiting when the vehicle can be started. The instructions require input signals from vehicle sensors that are already incorporated in the vehicle and are used for other purposes. Therefore, no additional components are necessary in the disclosed solution.

Figure 1:
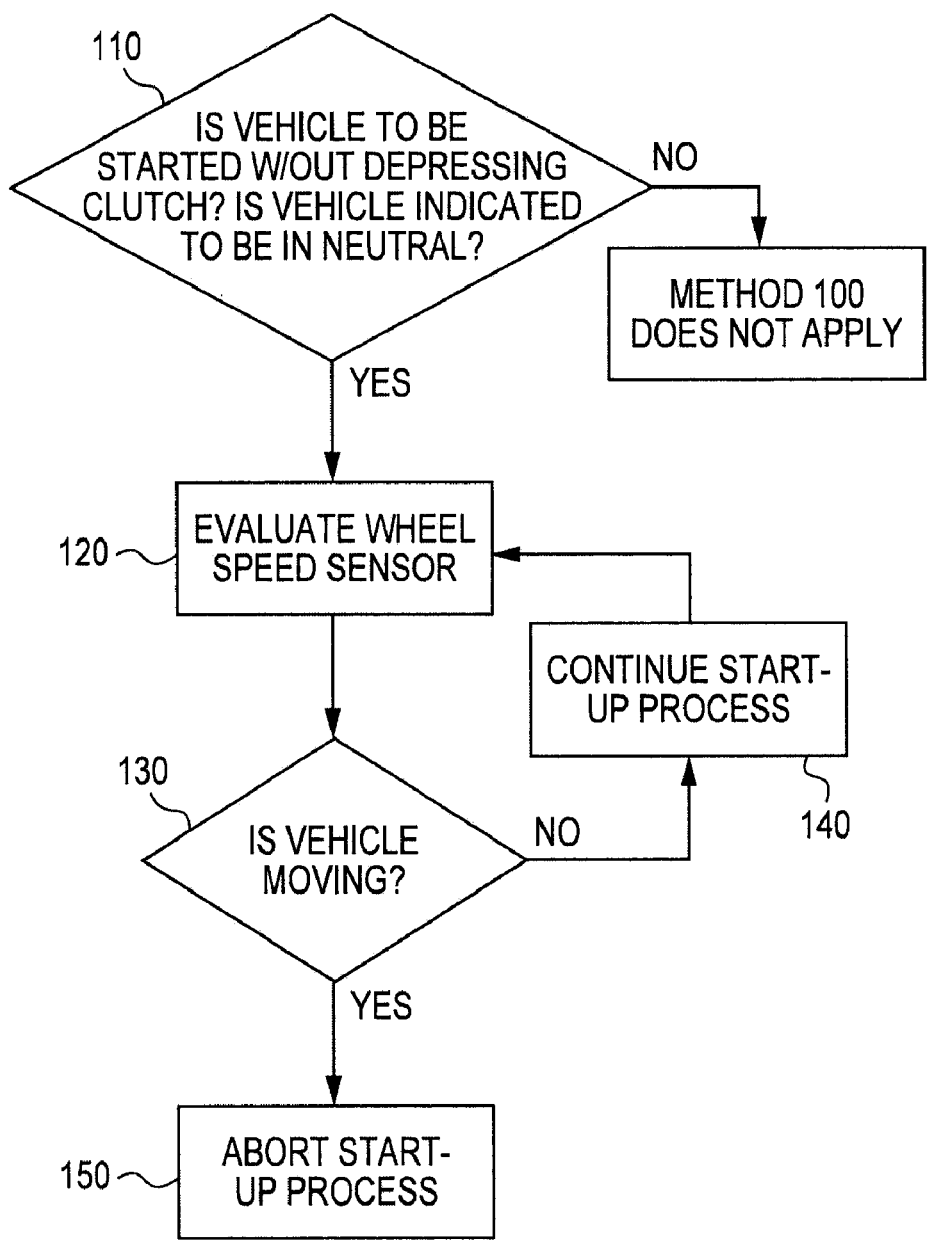
FIG. 1 is a method of diagnosing a false-neutral state and preventing unintended vehicle movement, according to a disclosed embodiment.

As illustrated in FIG. 1, when the ECU receives an indication that an operator is attempting to start the vehicle, the ECU executes method 100. Method 100 is executed if the operator attempts to start the vehicle, the vehicle is indicated as being in neutral by a gear shift sensor or other indicator and the operator does not depress the clutch (step 110). If these conditions are met, the ECU then evaluates an input signal from a wheel speed sensor (step 120). Wheel speed sensors are common in modern vehicles that include anti-lock braking systems (ABS). In an anti-lock braking system, the wheel speed sensors provide input relating to the rotational speed of a measured wheel, thus allowing the ABS to determine how to modify the vehicle's braking performance. In method 100, the wheel sensors also provide input regarding the rotational speed of a measured wheel. The ECU evaluates the received wheel speed signal and determines if the vehicle is moving or not by determining if the wheel speed is equal to zero (step 130). If the wheel speed is equal to zero (i.e., the vehicle is not moving) and the vehicle has been enabled to allow starting of the vehicle without depression of the clutch, then the ECU allows the vehicle to be started as long as the monitored wheel speed remains equal to zero (step 140). In other words, during the entirety of the vehicle start-up process, the ECU monitors the wheel speed of the vehicle and allows start-up to occur as long as the vehicle is not moving. If vehicle movement is detected (e.g., the monitored wheel speed is not equal to zero), the start-up process is aborted (step 150) and an error or problem is indicated to the driver.

Method 100 performs two important functions relating to a vehicle's movement. Initially, method 100 ensures that the vehicle is not moving when start-up is initialized. Additionally, if the vehicle is in a false-neutral state at start-up, the start-up process will result in the engine engaging the vehicle's powertrain and the vehicle will begin to move. Thus, method 100 senses the movement of the vehicle and quickly shuts-down the start-up process before damage can occur.

Figure 2:
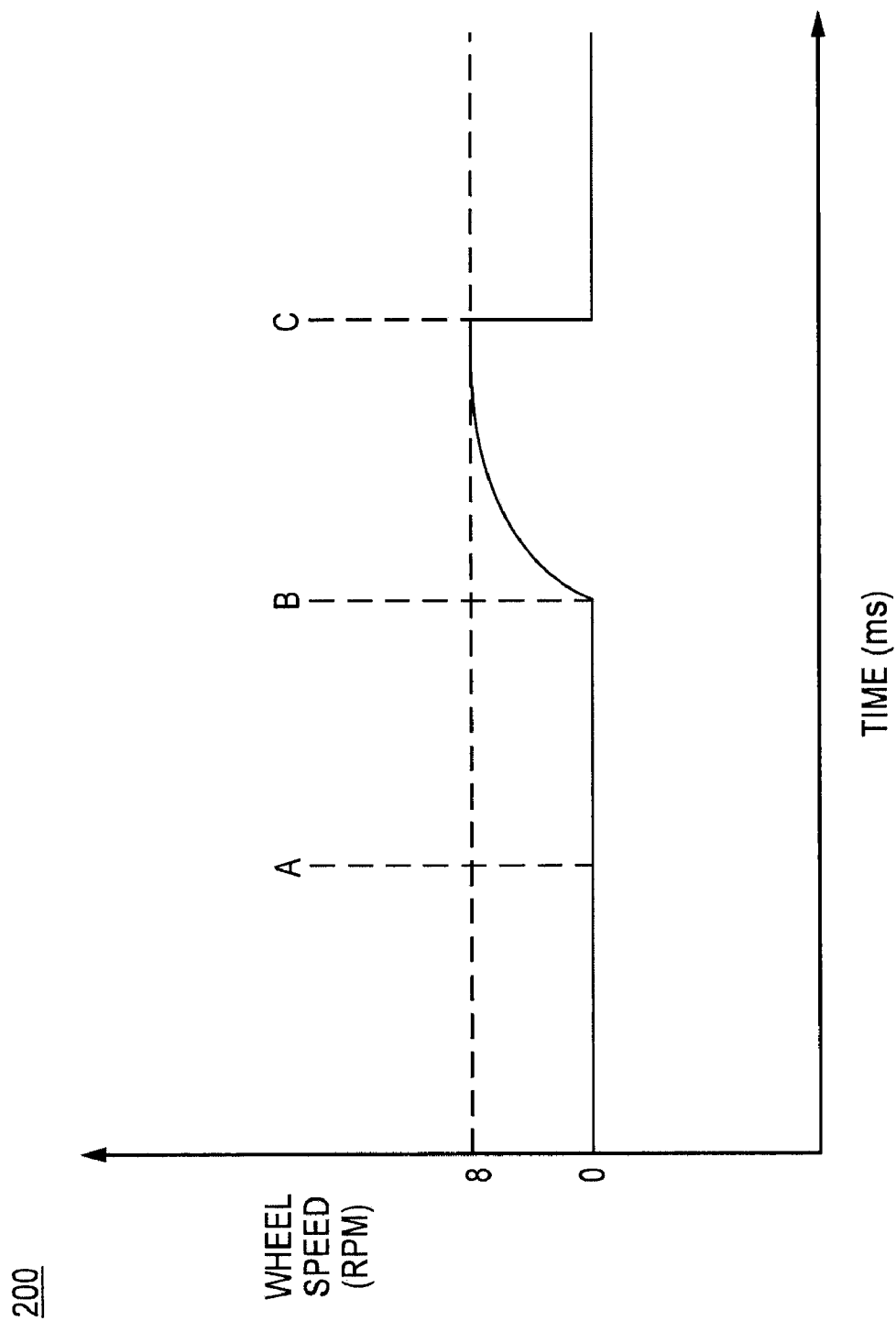
FIG. 2 is a timing diagram illustrating a method of preventing unintended vehicle movement arising from a false-neutral state, according to a disclosed embodiment.

FIG. 2 illustrates an example timing diagram 200 resulting from an application of method 100. FIG. 2 illustrates the wheel speed over time of a vehicle in a false-neutral state. At time A when a start-up process begins, the vehicle is not moving. Thus, the output from the wheel sensors indicates that the vehicle wheel speed is zero. Assuming that the vehicle allows for start-up in neutral without the depression of the vehicle's clutch, the vehicle is allowed to continue the start-up process. However, because the vehicle is in a false-neutral state, once the start-up proceeds, the vehicle begins to move forward (at time B). The vehicle's ECU senses the vehicle movement (step 140 in FIG. 1) and immediately shuts down the ignition process (at time C).

In the example of FIG. 2, the start-up process proceeds as normal until vehicle movement is detected. This means that the vehicle's engine actually does start in response to the vehicle's start-up process. At the moment that engine ignition occurs, the vehicle still is not moving and so the vehicle start-up process continues. However, as the engine begins to function, the vehicle's powertrain is engaged and the vehicle's wheels begin to move. Assuming that there is a short delay time between initial movement of the wheels and an indication by the vehicle's wheel sensors that the wheel is moving, the vehicle will move a short distance before the vehicle's ECU shuts down the start-up process. For example, if the vehicle operates for 200 ms before the vehicle's wheel sensors indicate movement of the vehicle, then the engine of vehicle will be rotating at approximately 150 revolutions/minute (RPM). Experimental conditions indicate that engine shutdown could take an additional period of time (in one example, an additional 130 ms). Thus, in this example, the vehicle could move for a total of 330 ms before complete shutdown occurs. With an engine rotation of 150 RPM, the wheels of the vehicle could have a wheel speed of up to 8 RPM (as illustrated in FIG. 2). Wheels rotating at a speed of 8 RPM for 330 ms will result in vehicle movement of approximately 4.2 inches. Therefore, while the method 100 does result in some movement of the vehicle before shutdown, the amount of vehicle movement is small and insignificant.

Advantages of using method 100 also include a reduction in component cost for the vehicle. Because method 100 uses existing vehicle components and does not require any additional components (e.g., redundant neutral switches required by alternative solutions to the described problem), method 100 results in an overall cost reduction for the vehicle. Additionally, method 100 still allows a driver of the vehicle to start the vehicle in neutral without requiring depression of the vehicle's clutch, which some drivers prefer. Method 100 also results in a greatly reduced potential for serious safety issues arising from a neutral switch short circuit in the vehicle.

Method 100 is of particular importance for a manual transmission engine with automatic on/off technology enabled. For example, a vehicle operating with automatic on/off technology enabled may automatically turn off the vehicle's engine when the vehicle is not moving (e.g., has a vehicle speed of zero). Upon an appropriate input, however, the vehicle may automatically restart the engine. For example, in order to preserve the vehicle's battery life or to provide additional power for providing passenger comforts requiring energy (e.g., radio, air conditioning, etc.), the vehicle may restart the engine. In this scenario, it is imperative that the vehicle employ method 100 in order to protect against a false-neutral state.

Figure 3:
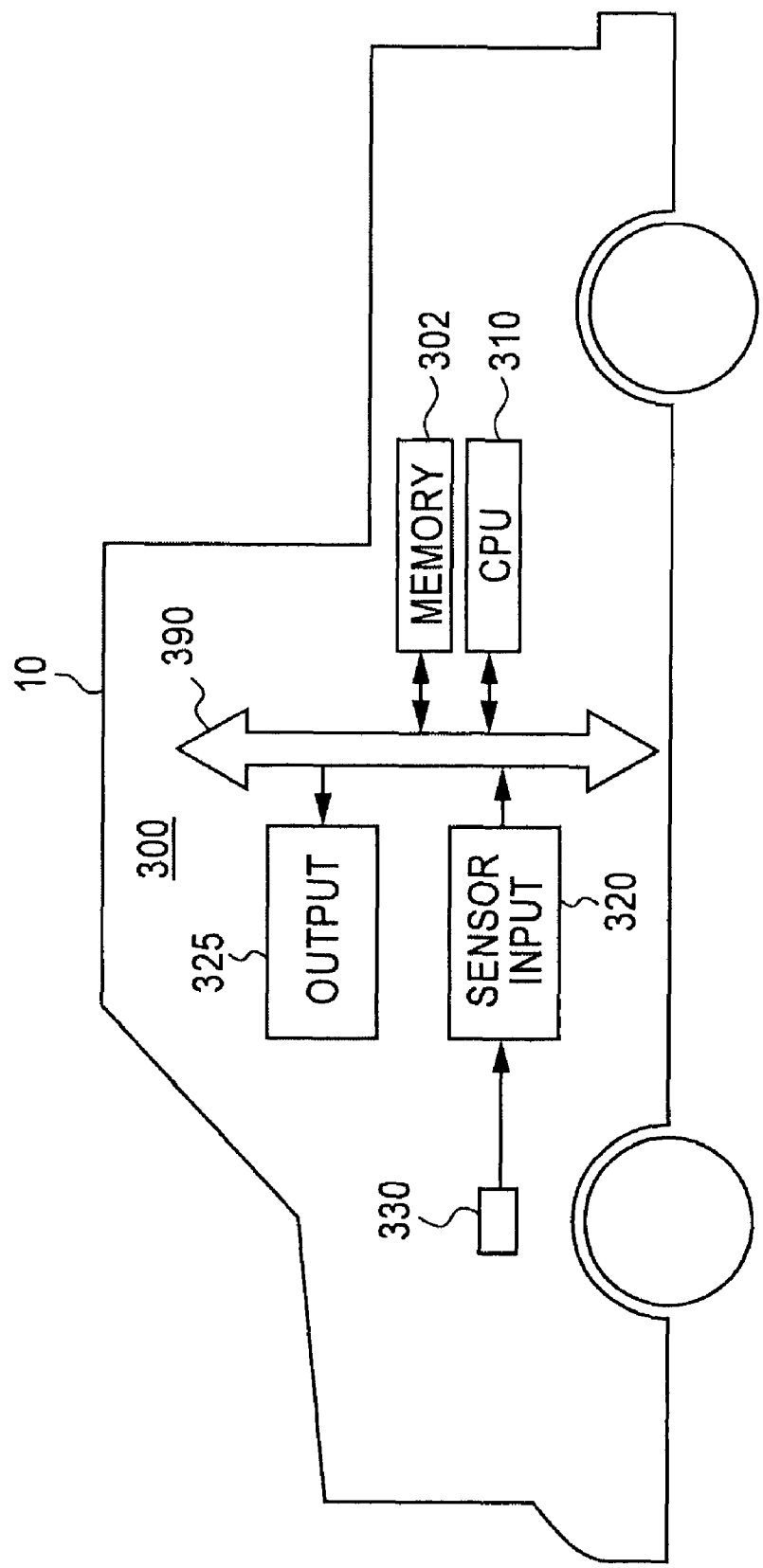
FIG. 3 is a processor system, according to a disclosed embodiment.

While some aspects of the above disclosure necessarily relate to hardware in a vehicle, methods of applying the above-identified method may be implemented in either software or hardware. FIG. 3 reflects one such embodiment, illustrating a processor system 300 in a vehicle 10. The processor system 300, such as a computer system, generally comprises a central processing unit (CPU) 310, such as a microprocessor, a digital signal processor, or other programmable digital logic devices, which communicates with a sensor input 320 and an output device 325 over at least one bus 390. The processor system 300 includes a memory device 302, which stores instructions to be implemented by the CPU 310 such as those needed to implement method 100. The memory device 302 communicates with the CPU 310 over bus 390 typically through a memory controller. The memory device 302 communicates to the CPU 310 instructions that the CPU 310 is to regularly evaluate input samples from the sensor input 320 if the vehicle 10 is to be started without depression of the vehicle's clutch and if the vehicle is believed to be in neutral. The sensor input 320 is coupled to one or more wheel sensors 330 in the vehicle 10. The CPU 310 in accordance with method 100 evaluates the wheel speed input samples and if any vehicle movement is indicated, the CPU 310 outputs a signal through the output 325 that aborts the vehicle start-up process. Upon vehicle start-up termination, an alarm or other indication may be shown to the driver of the vehicle to indicate that a problem occurred. Of course, multiple CPUs 310 may be used in system 300, and the entire system 300 could be implemented as a system on a chip (SOC), through integrated circuits (ICs), or through other methods known in the art.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A method of equipping a vehicle to prevent unintended vehicle movement arising from a false-neutral indication for the vehicle, the method comprising:

provilding at least one wheel speed sensor in the vehicle, the at least one wheel speed sensor configured to output a plurality of wheel speed signals;

coupling the at least one wheel speed sensor with a processor configured to process the plurality of wheel speed signals to determine whether the vehicle is moving during a vehicle start-up process, the processor further configured to output a termination signal if the vehicle is determined to be moving during the vehicle start-up process; and coupling the processor output with a vehicle control system to shut-down the vehicle upon receipt of the termination signal.

2. The method of claim 1, further comprising providing a memory for storing instructions to configure the processor.

3. The method of claim 1, wherein the processor is configured to determine whether the vehicle is moving during the vehicle start-up process if the vehicle's clutch is not depressed and if the vehicle is indicated as being in a neutral state.

4. The method of claim 1, wherein the vehicle control system is configured to shut-down the vehicle within a minimum amount of time required for the at least one wheel speed sensor to detect movement, for the processor to receive at least one of the plurality of wheel speed signals, and for the vehicle control system to receive the termination signal.

5. The method of claim 4, wherein the minimum amount of time is equal to or less than 330 ms.

6. The method of claim 1, wherein the vehicle control system is configured to shut-down the vehicle so as to minimize any vehicle movement resulting from the false-neutral indication.

7. The method of claim 1, wherein the at least one wheel speed sensor is provided as part of the vehicle's anti-lock braking system.

8. A system to prevent unintended vehicle movement arising from a false-neutral indication for the vehicle, comprising:

at least one wheel speed sensor in the vehicle configured to output a plurality of wheel speed signals;

a processor coupled to the at least one wheel speed sensor and configured to process the plurality of wheel speed signals to determine whether the vehicle is moving during a vehicle start-up process, the processor further configured to output a termination signal if it determines that the vehicle is moving during the vehicle start-up process; and a vehicle control system coupled to the processor and configured to shut-down the vehicle upon receipt of the termination signal.

9. The system of claim 8, further comprising a memory for storing instructions to configure the processor.

10. The system of claim 8, wherein the processor is configured to determine whether the vehicle is moving during the vehicle start-up process if the vehicle's clutch is not depressed and if the vehicle is indicated as being in a neutral state.

11. The system of claim 8, wherein the vehicle control system is configured to shut-down the vehicle within a minimum amount of time required for the at least one wheel speed sensor to detect movement, for the processor to receive at least one of the plurality of wheel speed signals, and for the vehicle control system to receive the termination signal.

12. The system of claim 11, wherein the minimum amount of time is equal to or less than 330 ms.

13. The system of claim 8, wherein the vehicle control system is configured to shut-down the vehicle so as to minimize any vehicle movement resulting from the false-neutral indication.

14. The system of claim 8, wherein the at least one wheel speed sensor is a part of the vehicle's anti-lock braking system.

* * * * *